Oct. 27, 1936.  H. E. IVES ET AL  2,058,882
ELECTROOPTICAL IMAGE PRODUCTION
Filed Nov. 12, 1927   2 Sheets-Sheet 1
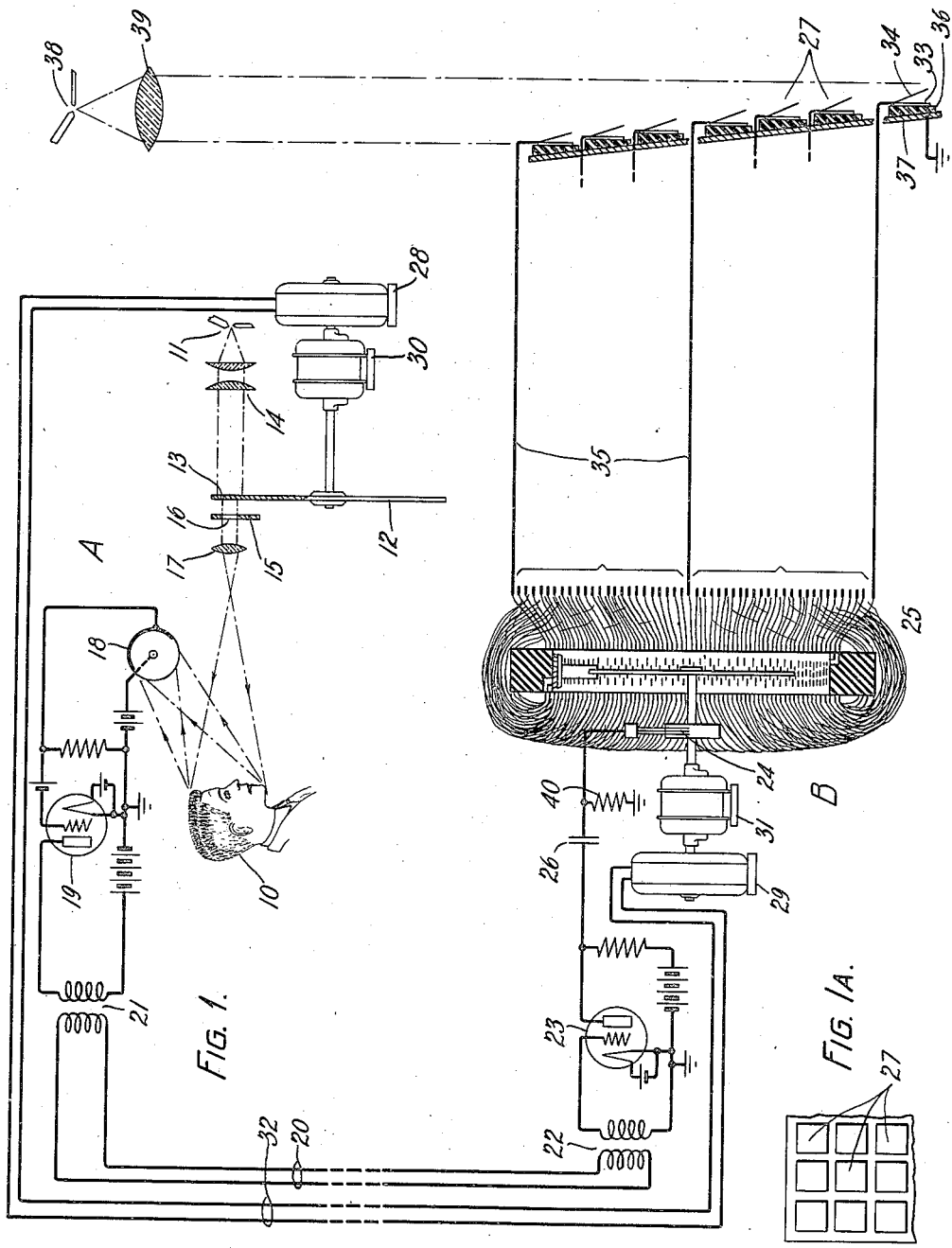
INVENTORS: HERBERT E. IVES
ROBERT C. MATHES
BY O. K. Sprague
ATTORNEY

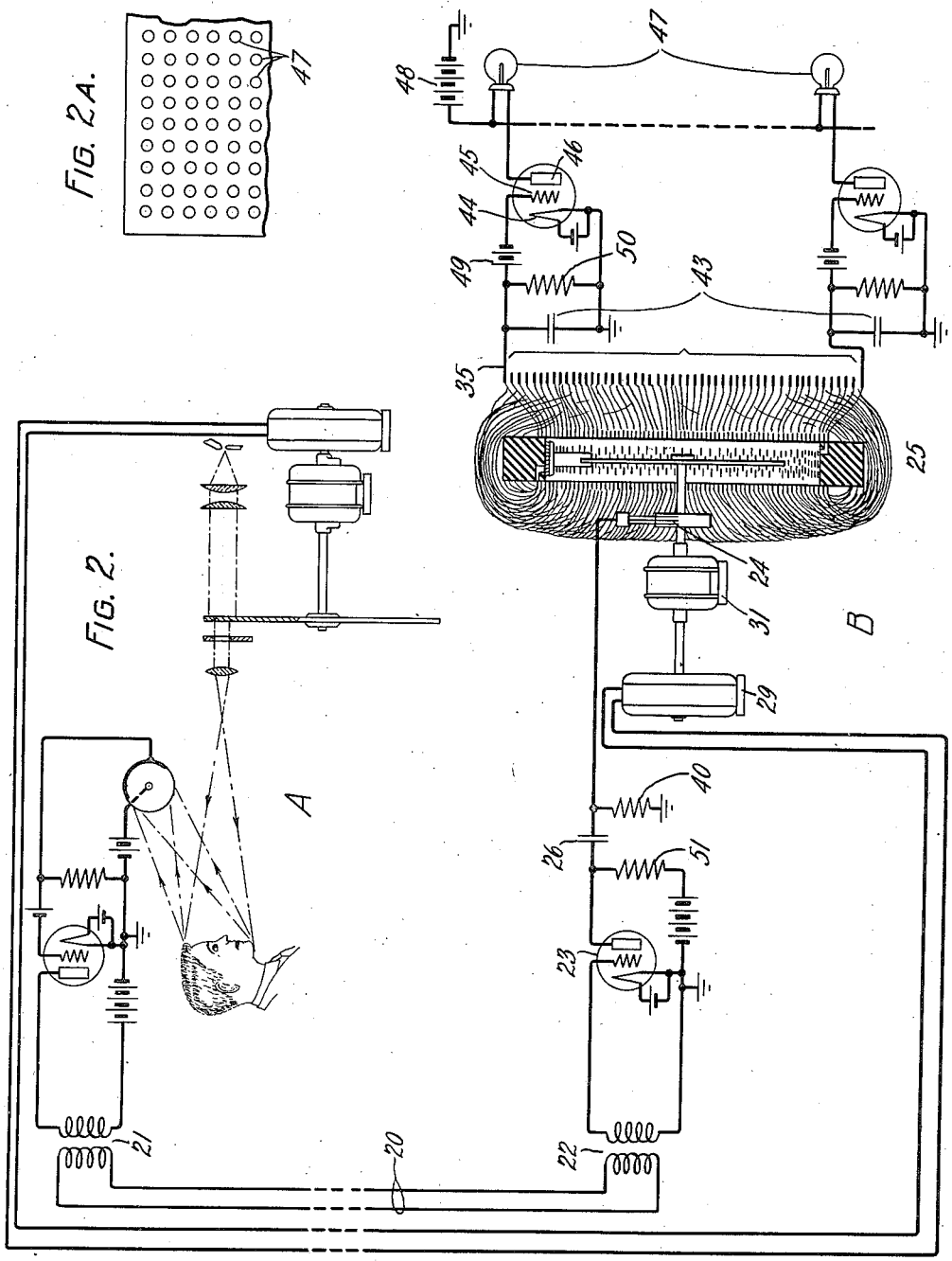

Patented Oct. 27, 1936

2,058,882

UNITED STATES PATENT OFFICE 2,058,882

ELECTROOPTICAL IMAGE PRODUCTION

Herbert E. Ives, Montclair, and Robert C. Mathes, Wyoming, N. J., assignors to Bell Telephone Laboratories, Incorporated, New York, N. Y., a corporation of New York Application November 12, 1927, Serial No. 232,768

46 Claims. (Cl. 178—6)

This invention relates to electro-optical image production and particularly to a method and means for increasing the brightness of images of the kind produced by television systems.

In a copending application of F. Gray, Serial No. 181,538, filed April 6, 1927, there is disclosed a system which has been used successfully for producing images electro-optically. In this system there is employed at the receiving station a bank of light emitting elements which are actuated periodically in succession by current impulses corresponding to instantaneous aspects of elemental areas of the object or field being scanned at the transmitting station, thereby setting up light impulses of short duration. These light impulses occur in rapid succession in order to give the eye of the observer the impression of seeing a complete image. Because of the short duration of each light impulse the apparent brightness of the image is relatively small.

In accordance with the present invention the light emitting elements of the image producing apparatus are actuated in succession to produce an image and the light emitted from each element when energized is caused to persist during succeeding energizations of other elements. More specifically stated, the elements are actuated in succession and periodically in accordance with instantaneous aspects of corresponding elemental areas of an object or field being scanned and are maintained actuated in accordance with a given aspect of the corresponding elemental area of the object or field while succeeding actuations of other elements take place, and preferably until the scanning cycle has been completed. The image produced in this manner appears considerably brighter than the image produced by the method in which only one element is in the actuated state at a time.

In another aspect the invention may be characterized as image producing apparatus comprising a plurality of light reflecting elements each corresponding to an elemental area of a field of view and movable over a limited range, all of the reflecting elements being illuminated from one or more common fixed sources of light, and means to cause any one of the elements to assume any one of a plurality of positions within its range of movement to control the amount of light reflected therefrom.

In a specific embodiment of the invention herein shown and described, the image producing apparatus comprises a bank of elements each of which is somewhat similar to the well-known gold-leaf electroscope. The amount of light which is diffusely reflected from each element is dependent on the angular position of the movable leaf thereof with respect to a source of light of constant intensity and the position of each of these movable leaves, in turn, is dependent on the magnitude of the image impulse impressed upon the corresponding element. The elements of the image producing apparatus are thus actuated in accordance with instantaneous aspects of corresponding elemental areas of an object or field being scanned and each element is maintained actuated in accordance with a given aspect of the corresponding elemental area of the object or field until it is actuated in accordance with a different aspect.

In addition to increasing the brightness of the image by sustaining the light produced by each element of the image producing apparatus while other elements are being actuated, the advantage of reducing flicker may be realized in cases where the aspect of one or more parts of the field of view remain fixed over a considerable period of time as compared with the scanning period. In a system in which the actuation of the elements is not fully sustained a light flash occurs each time that an image impulse corresponding to a given elemental area of the object or field of view is received, regardless of whether the aspect of this area is fixed or changing. In the preferred form of this invention, however, a light change occurs only at the elements of the image producing apparatus corresponding to the elemental areas of the field of view the aspect of which is changing while the light emitted by the elements corresponding to the unchanging areas of the field of view is sustained for a considerable period.

The invention may be readily understood by referring to the following detailed description and the accompanying drawings in which:

Fig. 1 is a diagrammatic view of a television system in accordance with the present invention;

Fig. 1—A shows, in elevation, a portion of the bank of light controlling elements employed in the system shown in Fig. 1;

Fig. 2 shows a modification of the television system shown in Fig. 1; and

Fig. 2—A shows, in elevation, a portion of the bank of light producing elements employed in the television system shown in Fig. 2.

Referring now to Fig. 1 of the drawings, there is shown a television system comprising a transmitting station A and a receiving station B, the station A being similar to that described in the co-pending application of F. Gray, referred to above. At the station A, the subject 10 comprising the field of view an image of which is to be produced at the receiving station, is located in front of a scanning apparatus. This apparatus comprises an arc lamp 11 and an optical system for causing a slender pencil of substantially parallel rays of intense light to sweep across the field in front of the scanning apparatus and scan the subject 10 in a series of successive parallel lines. The optical system includes a scanning disc 12 which has a number of small circular apertures 13 arranged in a spiral extending around the disc near its rim. Light from the arc 11 is directed by a lens system 14 so that an intense beam of light passes through each aperture as it moves across the illuminated area of the disc. An opaque screen 15 in front of the disc is provided with a rectangular opening 16 of such width as to transmit light from only one aperture of the scanning disc at a time. Lens 17 bends the slender pencil of parallel rays passing through the aperture 13 and the opening 16 to form an image of the moving aperture on the subject 10. As a result of this arrangement the subject is completely scanned once for each revolution of the disc in a series of successive parallel lines by a small, rapidly moving, intensely bright spot of light. As the spot of light passes over the subject light is diffusely reflected therefrom and a portion of the reflected light falls on the photosensitive surface of a large aperture photoelectric cell 18 which is connected to the input circuit of a vacuum tube amplifier 19.

The photoelectric cell causes an electromotive force which varies in accordance with the intensity of the light reaching it to be impressed on the input circuit of the vacuum tube amplifier 19 and the amplified electric wave or image current is transmitted to the receiving station B over a suitable transmission channel 20 which connects the transformers 21 and 22 located at the transmitting and receiving stations, respectively. The secondary winding of the transformer 22 is connected to the input circuit of a vacuum tube amplifier 23, the output circuit of which is connected to the brush 24 of the distributor 25 through a condenser 26 of large capacity and each contact segment of the distributor is connected to one of the bank of light emitting elements 27 of the image producing apparatus.

The scanning disc 12 at the transmitting station and the rotary distributor 25 at the receiving station are maintained in synchronism by any suitable apparatus which is diagrammatically represented by the devices 28 and 29 which are mechanically coupled to the driving motors 30 and 31 located at the transmitting and receiving stations, respectively, and which are shown connected by the transmission line 32. A synchronizing system which has been employed successfully in connection with a television system is disclosed in a copending application of H. M. Stoller and E. R. Morton, Serial No. 181,314, filed April 6, 1927.

Each of the bank of light emitting or controlling elements 27 of the image producing apparatus corresponds to a particular elemental area of the subject 10 and these elements are actuated in succession and periodically in accordance with the magnitude of the image impulses corresponding to the successively scanned elemental areas of the subject. Each of the elements 27 comprises a fixed plate 33 and an angularly movable plate 34 which are electrically connected to one of a plurality of conductors 35 leading to one of the terminals of the distributor 25. The stationary plate 33 is connected to an insulating block 36 which, in turn, is attached to a grounded metallic plate 37. The electric arc 38 together with the lens 39 constitutes a source of parallel light rays, the direction of which is parallel to the plane of the movable members 34 of the light emitting elements when in their normal position, namely vertical.

When a current impulse corresponding to one of the elemental areas of the object 10 is received, it is amplified by the amplifier 23 transmitted through the condenser 26 and resistance 40 to ground. The stationary and movable members of the light emitting element 27 which is connected through the distributor 25 to the resistance 40 at the time that this current impulse is received, are charged with respect to ground by the potential drop across the resistance 40. Due to the charges of equal polarity on the stationary and movable members repelling each other, the movable member is caused to diverge from the stationary member and remains in this actuated condition until an image impulse of different magnitude is received for this particular element.

Each movable member 34 has a matt surface which diffusely reflects light of an intensity proportional to the cosine of the angle which the normal to the reflecting surface makes with the direction of the incident light in accordance with the well-known law of Lambert, (see "Treatise on Light" by R. A. Houstoun, pages 361 and 362, Longman's Green & Company, Ltd., London). When the maximum deflection of each member 34 with respect to the direction of the incident light is small, the intensity of the reflected light reaching an observer is practically directly proportional to the charge received by the element and therefore to the magnitude of the incoming image current. When larger deflections of the movable member are employed, the resulting distortion can be corrected for by operating the vacuum tube 23 on a non-linear portion of its characteristic. It should be noted that the light emitting elements are positioned along a surface which slopes with respect to the vertical sufficiently that the light reflecting member of one element does not shadow the light reflecting member positioned below it.

The transmitting station A shown in Fig. 2 is the same as that shown in Fig. 1 and described above. At the receiving station B of Fig. 2, the apparatus extending from the transmission channel 20 up to and including the distributor 25 is also the same as corresponding apparatus shown in Fig. 1 and all of the corresponding parts in the two figures bear the same numeral designations. In the embodiment of the invention shown in Fig. 2, instead of charging the light emitting elements directly in accordance with the incoming image impulses, each impulse is impressed upon one of a plurality of condenser elements 43 which is connected in the input circuit of one of a plurality of repeater elements having a cathode 44, a grid or control element 45 and an anode 46. One of a bank of light emitting elements 47, such as a small incandescent lamp is connected in the anode circuit of each repeater in series with a source of anode current 48. The grid 45 of each repeater is normally biased by a battery 49 through a resistance 50 so that the anode current is of such a magnitude that the lamps normally appear dark but emit an appreciable amount of light when the anode current is increased slightly.

This increase in anode current and the consequent emission of light occurs when one of the condensers 43 becomes charged in accordance with an incoming image impulse corresponding to the tone value of an elemental area of the subject 10. The electromotive force to which the condenser is charged is impressed across the terminals of the resistance 50, thus placing a positive electromotive force in series with the negative biasing battery 49 and causing the anode current to increase. The charge on each condenser and the resulting illumination produced by the lamp associated therewith is maintained in accordance with the magnitude of a given image impulse and, therefore, in accordance with a given aspect of an elemental area of the subject until an image impulse of different value corresponding to a different aspect of the elemental area of the subject is received. The value of resistance 40 and the capacity of the condenser 43 should preferably be such that the condenser can be charged in accordance with the received image impulse during the time that the distributor completes a circuit through each contact. Satisfactory results can be obtained by employing a condenser having a capacity of 0.001 microfarad and a resistance of 5,000 to 10,000 ohms. The value of resistances 50 should be sufficiently high that the condensers 43 do not discharge appreciably in the time required for a single scanning of the object. A resistance of 100 megohms which may represent the leakage resistance of one of the condensers 43 has been found to be satisfactory. The system shown in Fig. 2 is the same as that shown in a copending application of R. C. Mathes, Serial No. 232,751, filed on even date herewith.

It is to be understood that it is within the scope of the invention to employ a suitable apparatus for recording images of an object or field of view instead of receiving the images directly by the eye. Accordingly, it is also within the scope of the invention to employ, instead of the light emitting elements, other elements which emit or control energy of a frequency range which extends above or below the visible spectrum. It is apparent from the above description that the term "light emitting elements" as used herein includes primary sources of light and also secondary sources such as light valves or reflectors. The term "television" as herein used is intended to cover recording as well as direct viewing and also the use of so-called invisible radiations.

What is claimed is:

1. In an electro-optical image producing system, a bank of light emitting elements, each corresponding to an elemental area of a field of view, means for actuating said elements in succession in accordance with instantaneous aspects of corresponding elemental areas of said field of view, and means for maintaining each of said elements actuated in accordance with a given aspect of the corresponding elemental area of the field of view until it is actuated in accordance with a different aspect.

2. In an electro-optical image producing system, a bank of elements for reflecting light, light emitting means for directing light to said reflecting elements, means for receiving image current representative of light tone values of elemental areas of an object scanned at a distant point, means for moving said reflecting elements in succession to produce an image, and means for maintaining each element in its changed position while succeeding movements of other elements take place.

3. In an electro-optical image producing system, a bank of elements each having a movable member for diffusely reflecting light in accordance with the position thereof to control the production of an image, and means for maintaining the movable member of each element in its actuated position while succeeding actuations of other elements take place.

4. In an electro-optical image producing system, a bank of electrical storing elements each having a movable member the position of which controls the tone value of an elemental area of the image produced, and means for charging said electrical storing elements in accordance with the received image impulses for controlling the position of said movable members.

5. In an electro-optical image producing system, a bank of light emitting elements, means for impressing electrical impulses on said elements in succession to control the production of an image, and means for storing said electrical impulses for causing the light emitted from each element, when energized, to persist during succeeding energizations of other elements.

6. In an electro-optical image producing system, an image producing apparatus having a plurality of light emitting elements, means for impressing electrical impulses on said elements in succession and periodically to control the production of an image, and electrical storing means associated with each element for causing light emitted therefrom, when energized, to persist during succeeding energizations of the remaining elements.

7. A television system comprising means for generating electrical impulses corresponding to the shades of elemental areas of a field or object an image of which is to be produced, means for impressing said electrical impulses in succession and periodically on the elements of an image producing apparatus thereby controlling the intensity of the light emitted by successive elemental areas thereof, and means for sustaining the light emitted at each elemental area while electrical impulses are being impressed on succeeding elements of the image producing apparatus.

8. An electro-optical image producing apparatus comprising a plurality of elements for storing electrical energy in accordance with the magnitude of the image currents corresponding to the elemental areas of the field or object an image of which is to be produced, and a movable member associated with each of said storing elements for diffusely reflecting light from a constant source in accordance with the position thereof, said position being determined by the magnitude of the charge stored in the element with which said movable member is associated.

9. In an apparatus for producing images in response to received electrical energy, a source of substantially parallel light rays, a bank of elements having a stationary member and a movable member with a diffusely reflecting surface in electrical contact, said movable member being normally in alignment with the light rays from said source and, when actuated, at an angle with respect to the direction of said light rays.

10. An electro-optical image producing system, comprising a transmitting station and a receiving station, a transmission medium connecting said stations, means including a rotary scanning device at said transmitting station for causing electrical impulses of a range of values between fixed limits corresponding to the shades of elemental areas of a field of view to be impressed on said transmission medium, a bank of light emitting elements at said receiving station, a rotary distributor for impressing the received electrical impulses on said light emitting elements in succession and periodically, means for maintaining each of said elements actuated in accordance with the values of said electrical impulses while succeeding actuations of other elements take place, and means for maintaining said scanning device and said distributor in synchronism.

11. Image producing or display apparatus comprising a plurality of light reflecting elements each corresponding to an elemental area of a field of view and angularly movable over a limited range, a fixed source of light, and means for causing any desired reflecting element to assume any one of a plurality of positions within said range to vary the amount of light intercepted thereby and reflected therefrom in accordance with its position.

12. Image producing or display apparatus comprising a plurality of light reflecting elements with diffusely reflecting surfaces, each element corresponding to an elemental area of a field of view and movable about a fixed axis over a limited range, a fixed source of light, and means for causing any desired reflecting element to assume any one of a plurality of positions within said range to vary the amount of light diffusely reflected therefrom.

13. Image producing or display apparatus comprising a plurality of light reflecting elements each corresponding to an elemental area of a field of view and movable over a limited range, a fixed source of light, and means for electrostatically repelling or attracting any desired reflecting element so as to assume any one of a plurality of positions within said range to vary the amount of light reflected therefrom.

14. Image producing or display apparatus comprising a plurality of light reflecting elements each corresponding to an elemental area of a field of view and angularly movable over a limited range, a fixed source of light, and means for actuating said elements in succession for causing them to assume any one of a plurality of positions within said range to control the amount of light intercepted thereby and reflected from each element in accordance with the tone value of a corresponding elemental area of said field of view.

15. Image producing or display apparatus comprising a plurality of light reflecting elements not all in the same plane when actuated, each of said elements corresponding to an elemental area of a field of view and movable over a limited range, a fixed source of light, and means for causing any desired reflecting element to assume any one of a plurality of positions within said range to vary the amount of light intercepted by said element and reflected therefrom.

16. In a television system, means for transmitting electric currents corresponding to the elements of a picture to be transmitted, and means for reproducing said picture under control of said currents, said last mentioned means comprising means for storing a set of image current impulses for periods longer than the duration of the impulses.

17. The method of transmitting and reproducing images electrically which comprises analyzing the image into corresponding image points, translating said points into corresponding electric current impulses, transmitting said impulses to a receiving station, storing said impulses at the receiving station for periods longer than the duration of the impulses to produce an electrical record of the image, and translating said record into a complete visual reproduction of the image.

18. In an electro-optical system for producing images of a field of view, a plurality of condenser elements, and means for charging said elements in succession periodically to potentials corresponding respectively to tone values of elemental areas of said field of view.

19. An electro-optical image producing system comprising means for transmitting to the image producing station electrical energy characteristic of the tone values of elemental areas of a field of view, an image of which is to be produced, and means, including a bank of condenser elements at the image producing station for storing said electrical energy for a period after the supply of energy to a condenser has been interrupted, for controlling the production of the image.

20. In a television system, means for producing an image under control of electrical impulses, and means at the image producing station for increasing the brilliancy of said image comprising a bank of condenser elements at the image producing station for storing said electrical impulses for a period after the supply of energy to a condenser has been interrupted.

21. In receiving apparatus for television having a scene-displaying screen comprising a plurality of lamps allocated to particular areas of the screen and to which energy is supplied from a received signal impulse intermittently in rotation, the provision for each lamp of means for accumulating energy proportional to the signal impulse applied to the lamp and for discharging it to maintain the illumination of the lamp after the signal impulse to the lamp has ceased.

22. In receiving apparatus for television systems the combination of a relay operated by the received signals, a lamp energized through the relay and means in circuit with the said lamp for accumulating energy due to a received signal impulse while the signal is active for the purpose of maintaining the lamp illuminated proportionally to the amplitude of the signal-impulse but over a longer period than is occupied by the impulse.

23. The method of transmitting and reproducing images electrically which comprises analyzing the image into corresponding image points, translating said points into a succession of electric current impulses each having an amplitude corresponding to the tone value of one of said image points, storing said impulses at a receiving station to produce a non-visual record of the image, and translating said record into a complete visual reproduction of the image.

24. In an electro-optical system for producing images of a field of view, a plurality of condenser elements, means for scanning elemental areas of said field of view in succession, a source of potential, means for varying said potential in accordance with the tone values of successively scanned elemental areas, and means for successively electrically connecting each of said condenser elements one at a time and periodically with said source of varying potential.

25. In an electro-optical system for producing images of a field of view, means for scanning elemental areas of said field in succession, a source of potential, means for varying the amplitude of said potential in accordance with successively scanned elemental areas, a condenser, and means for periodically electrically connecting for a short interval said condenser with said source of potential.

26. In an electro-optical system for producing images of a field of view, a space discharge repeating device, a plurality of condenser elements, one for each elemental area of said field of view, and a rotary distributor for directly connecting said condenser elements for short intervals in turn to the output circuit of said repeating device.

27. In a television system, means for transmitting current impulses having characteristics corresponding respectively to the tone values of elemental areas of a picture or object, and means for producing an image of said picture or object under control of said current impulses, said last-mentioned means comprising a bank of condensers for storing a set of image current impulses for periods longer than the duration of the impulses.

28. The method of transmitting an image electrically which comprises analyzing the image into a plurality of successive image points, producing a corresponding set of time-displaced impulses corresponding to said image points, using said impulses to produce a non-pictorial record of the picture, and using said record to produce a set of simultaneous electrical image impulses.

29. In an electro-optical image producing system, the combination of means for translating a portion of a field of view into a corresponding series of electrical impulses, means for translating said serial impulses into non-serial simultaneous impulses, and means controlled by said simultaneous impulses for producing an image of said portion of the field of view.

30. In a television system, the combination of means for translating a set of image points having a variety of tone values into a corresponding series of electric impulses having a variety of amplitudes corresponding to said tone values, means for translating the serial impulses into electric impulses overlapping in time and having a variety of potentials corresponding to the amplitudes of said serial impulses, and means controlled by the latter impulses for producing an entire image, all points of said image being produced simultaneously.

31. In a television system, means for reproducing an image electrically comprising means for storing a series of successively transmitted electric image impulses having a characteristic varying in accordance with tone values so that the resulting storages of energy corresponding respectively to said impulses are overlapping in time, and means, comprising means for releasing said stored energy, to reproduce on a screen a complete image.

32. In an electro-optical image producing system, a bank of elements, one for each elemental area of an object an image of which is to be produced, for producing the image by light emanating therefrom, means for supplying said elements with electric energy, a source of current representative of a variety of tone values of the elemental areas of the object for controlling the energization of said elements repeatedly in succession to cause them to emit light to reproduce said tone values, and means including circuit control means for causing energy locally supplied to each of said elements, during the time the corresponding image current is applied, to maintain the emanation of light from that element during at least a large portion of the period of said cyclic energization.

33. A television image producing system comprising a bank of light controlling elements, means for impressing electrical impulses on said elements in succession to control the production of an image, and means for storing said electrical impulses for causing the emission of light controlled by each element when energized, to persist for a period during which said electrical impulses are being impressed upon other light controlling elements.

34. A television image producing apparatus comprising a source of energizing current, a plurality of light emitting means one for each elemental area of an image field each for emitting light of an intensity extending over a range of values between fixed limits in accordance with the amplitude of the energizing current from said source supplied thereto, a source of image current having amplitudes extending over a range of values between fixed limits corresponding to the tone values of successive elemental areas of a field of view, and means controlled by said image current for controlling the amplitudes of the energizing current supplied to said light emitting means respectively and for maintaining the emission of light from each light emitting means for a period after the image current ceases to control said light controlling means.

35. A television system comprising means for transmitting to an image producing station electric impulses corresponding to the tone values of successive elemental areas of a field of view, an image of which is to be produced, and means for producing an image of said field of view under control of said electric impulses, said last mentioned means comprising means for storing a set of electric image impulses.

36. The method of producing television images of a field of view which comprises setting up electric impulses in succession corresponding to the tone values of successive elemental areas of the field of view, storing said impulses to produce an electrical record of the image, and translating said record into an optical image of the field of view.

37. In an electro-optical system for producing images of a field of view, means for scanning elemental areas of said field of view in succession, a source of electric energy, means for varying said energy in accordance with the tone values of successively scanned elemental areas, electric storage means, and means for periodically causing said storage means to be controlled for a short interval by said source of electric energy.

38. Television image producing apparatus comprising means for emitting light to produce an image under control of successively transmitted electric impulses corresponding to the tone values of successive elemental areas of a field of view, and means for increasing the apparent brilliancy of said image comprising a bank of elements for storing said electric impulses.

39. Electro-optical image producing apparatus comprising means for storing electric energy at positions substantially corresponding respectively to the positions of the elemental areas of an image field, and means for successively impressing electric energy upon said storage means at different positions to control the production of an image.

40. Electro-optical image producing apparatus comprising a plurality of elements for storing electric energy arranged to occupy positions substantially corresponding to the positions of the elemental areas of an image field, a source of electric energy having variations corresponding to the variations in tone value of successive elemental areas of a field of view, and means for causing said storage elements to be controlled in succession by said source of electric energy to control the production of an image of said field of view.

41. An electro-optical image producing apparatus comprising a plurality of elements for storing electric energy arranged to occupy positions substantially corresponding to the positions of the elemental areas of an image field, a source of electric energy having variations corresponding to the variations in tone value of successive elemental areas of a field of view, means for causing said storage elements to be controlled in succession by said source of electric energy, and means controlled by said storage elements to control the production of an image of said field of view.

42. In an electro-optical image producing system, means for producing the image by light emanating therefrom and having a plurality of portions each corresponding in position to an elemental area of a field of view, a source of electric energy, a source of current representative of tone values of the elemental areas of the field of view for controlling the energization of said portions by energy from said source repeatedly in succession to cause them to emit light to produce said tone values, and means for causing energy locally supplied to each portion during the time the corresponding image current is applied, to maintain the emanation of light from that portion for a period after the supply of image current to that portion is interrupted, said period being of the same duration for each of said portions.

43. An apparatus for producing images electro-optically comprising a source of image current representative of black and white and intermediate tones of elemental portions of the object field of which images are to be produced, means for successively and repeatedly establishing a light emission under control of said current and corresponding in intensity to that of the corresponding portions of the object field, and electric storage means associated with said last-mentioned means for causing said light emission, when established, to be maintained for a period after said current ceases to control said light emission from said elemental portions.

44. The method of producing images electro-optically which comprises amplifying a received electric current representative of black and white and intermediate tone values of elemental portions of the object field of which images are to be produced, establishing in turn a light emission for the elemental portions of the image under control of said amplified current and corresponding in intensity to that of the corresponding portions of the object field, and electrically storing the current impulses representative of the tone values of the elemental portions to cause the light emission for each elemental portion to take place for a period many times greater than that necessary to establish said emission.

45. In an electro-optical image producing system, a bank of light control elements each having a signal controlled movable member, light emitting means for directing light to said elements, the positions of said movable means determining the amount of image forming light emanating from said elements respectively to determine the tone values of the representative elemental areas of the image produced, and means for actuating said elements in succession for controlling the position of said movable member of each element while succeeding actuations of other elements take place.

46. Television apparatus comprising an array of electro-optical translating elements forming an optical field, each of said elements corresponding in position in said field to one elemental area of an object to be imaged and constituting a part of an electric storage element, means for charging said storage elements and for subsequently discharging at least some of said elements by the required amount to make them correctly representative of the tone values of corresponding elemental areas of said object.

ROBERT C. MATHES.
HERBERT E. IVES.